(12) United States Patent
Drader et al.

(10) Patent No.: US 8,009,978 B2
(45) Date of Patent: Aug. 30, 2011

(54) HANDHELD ELECTRONIC DEVICE AND CAMERA PROVIDING FLASH COMPENSATION OF IMAGES, AND ASSOCIATED METHOD

(75) Inventors: Marc Drader, Kitchener (CA); Michael Purdy, Kitchener (CA); Ken Wu, Burlington (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/724,717

(22) Filed: Mar. 16, 2010

(65) Prior Publication Data
US 2010/0172640 A1  Jul. 8, 2010

Related U.S. Application Data

(63) Continuation of application No. 11/626,994, filed on Jan. 25, 2007, now Pat. No. 7,702,235.

(51) Int. Cl.
*G03B 15/03* (2006.01)
(52) U.S. Cl. .................. 396/176; 348/251; 382/274
(58) Field of Classification Search .............. 396/176; 348/251; 382/274
See application file for complete search history.

(56) References Cited

U.S. PATENT DOCUMENTS

| | | | |
|---|---|---|---|
| 5,343,302 A | 8/1994 | Yamashita | |
| 6,670,988 B1 * | 12/2003 | Gallagher et al. | 348/224.1 |
| 7,151,560 B2 | 12/2006 | Matherson | |
| 7,212,239 B2 | 5/2007 | Sakaguchi | |
| 7,391,450 B2 | 6/2008 | Pinto et al. | |
| 7,702,235 B2 * | 4/2010 | Drader et al. | 396/176 |
| 2003/0044066 A1 | 3/2003 | Sakaguchi | |
| 2003/0234864 A1 | 12/2003 | Matherson | |
| 2004/0041919 A1 | 3/2004 | Yamanaka | |
| 2004/0257454 A1 | 12/2004 | Pinto et al. | |
| 2006/0098240 A1 | 5/2006 | Funamoto | |
| 2006/0098403 A1 * | 5/2006 | Smith | 361/683 |
| 2007/0034890 A1 * | 2/2007 | Daschner et al. | 257/100 |

FOREIGN PATENT DOCUMENTS

| | | |
|---|---|---|
| EP | 1045573 A | 10/2000 |
| JP | 2003283922 A | 10/2003 |

OTHER PUBLICATIONS

U.S. Appl. No. 11/626,994, Notice of Allowance dated Dec. 3, 2009.

* cited by examiner

*Primary Examiner* — Christopher E Mahoney
*Assistant Examiner* — Fang-Chi Chang
(74) *Attorney, Agent, or Firm* — Leslie A. Kinsman; Borden Ladner Gervais LLP (57) ABSTRACT

An improved handheld electronic device and camera apparatus upon which can be executed an improved method enable a modular camera to be used in conjunction with a flash. In one implementation, compensation parameters that are intended for use in a non-flash situation are overwritten with compensation parameters that are configured to compensate for the combined effects of the camera and the flash and are used by an embedded compensation routine executed on the camera. In another implementation, an image signal is processed by the embedded compensation routine using the original compensation parameters, but if it is determined that the image signal is a flash image signal, the image signal is further processed by the embedded compensation routine employing an additional set of parameters which compensate the image signal for the effect of the flash.

20 Claims, 6 Drawing Sheets

| R 2.5 | G 2.0 | R 1.5 | G 1.5 | R 1.5 | G 1.5 | R 2.0 | G 2.5 |
|---|---|---|---|---|---|---|---|
| G 2.0 | B 1.5 | G 1.0 | B 1.0 | G 1.0 | B 1.0 | G 1.5 | B 2.0 |
| R 1.5 | G 1.0 | R 1.0 | G 1.0 | R 1.0 | G 1.0 | R 1.0 | G 1.5 |
| G 1.5 | B 1.0 | G 1.0 | B 1.0 | G 1.0 | B 1.0 | G 1.0 | B 1.5 |
| R 1.5 | G 1.0 | R 1.0 | G 1.0 | R 1.0 | G 1.0 | R 1.0 | G 1.5 |
| G 1.5 | B 1.0 | G 1.0 | B 1.0 | G 1.0 | B 1.0 | G 1.0 | B 1.5 |
| R 2.0 | G 1.5 | R 1.0 | G 1.0 | R 1.0 | G 1.0 | R 1.5 | G 2.0 |
| G 2.5 | B 2.0 | G 1.5 | B 1.5 | G 1.5 | B 1.5 | G 2.0 | B 2.5 |

FIG. 6

| R 7.8 | G 4.0 | R 3.0 | G 3.0 | R 3.0 | G 3.0 | R 4.0 | G 7.8 |
|---|---|---|---|---|---|---|---|
| G 3.6 | B 2.0 | G 1.3 | B 1.3 | G 1.3 | B 1.3 | G 2.0 | B 3.6 |
| R 2.1 | G 1.0 | R 1.0 | G 1.0 | R 1.0 | G 1.0 | R 1.0 | G 2.1 |
| G 2.1 | B 1.0 | G 1.0 | B 1.0 | G 1.0 | B 1.0 | G 1.0 | B 2.1 |
| R 2.1 | G 1.0 | R 1.0 | G 1.0 | R 1.0 | G 1.0 | R 1.0 | G 2.1 |
| G 2.1 | B 1.0 | G 1.0 | B 1.0 | G 1.0 | B 1.0 | G 1.0 | B 2.1 |
| R 3.6 | G 2.0 | R 1.3 | G 1.3 | R 1.3 | G 1.3 | R 2.0 | G 3.6 |
| G 7.8 | B 4.0 | G 3.0 | B 3.0 | G 3.0 | B 3.0 | G 4.0 | B 7.8 |

HANDHELD ELECTRONIC DEVICE AND CAMERA PROVIDING FLASH COMPENSATION OF IMAGES, AND ASSOCIATED METHOD

CROSS-REFERENCE TO RELATED APPLICATIONS

This application is a continuation of U.S. application Ser. No. 11/626,994 filed Jan. 25, 2007 the contents of which are incorporated by reference in their entirety.

FIELD

The disclosed and claimed concept relates generally to handheld electronic devices and, more particularly, to a handheld electronic device and camera that provide compensation for a flash in the processing of images, and an associated method.

DESCRIPTION OF THE RELATED ART

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Some handheld electronic devices and other electronic devices employ small cameras which can take photographs that are then stored on the electronic device. Such cameras typically comprise a camera lens, a sensor, and a processor system that are manufactured and sold as a modular unit. That is, the sensor receives light through the camera lens and provides an image signal to an embedded program stored and executed on the processor system in order to process the image in various ways. For instance, the image might be processed to compensate for various shortcomings of the camera lens. Such shortcomings might include the reflective and diffractive aspects of the camera lens that become pronounced at the edges of the camera lens.

While such cameras have been generally effective for their intended purposes, such cameras have not however, been without limitation. A camera typically has only a limited ability to detect light and often is of limited usefulness in low light conditions. Since a camera flash typically produces light of varying intensity and spectrum across a region of illumination, an embedded program executed on a processor system of a camera and employing compensation parameters tailored for use of a camera alone, i.e., without a flash, can produce unpredictable image processing results. Such unpredictable image processing results are further made unpredictable due to the wide variety of camera flash and flash lens configurations that are possible. It thus would be desirable to enable a modular camera, such as would be incorporated into a handheld electronic device, to be more usable in low light conditions.

BRIEF DESCRIPTION OF THE DRAWINGS

A full understanding of the disclosed and claimed concept can be obtained from the following Description when read in conjunction with the accompanying drawings in which:

DESCRIPTION

Figure 1:
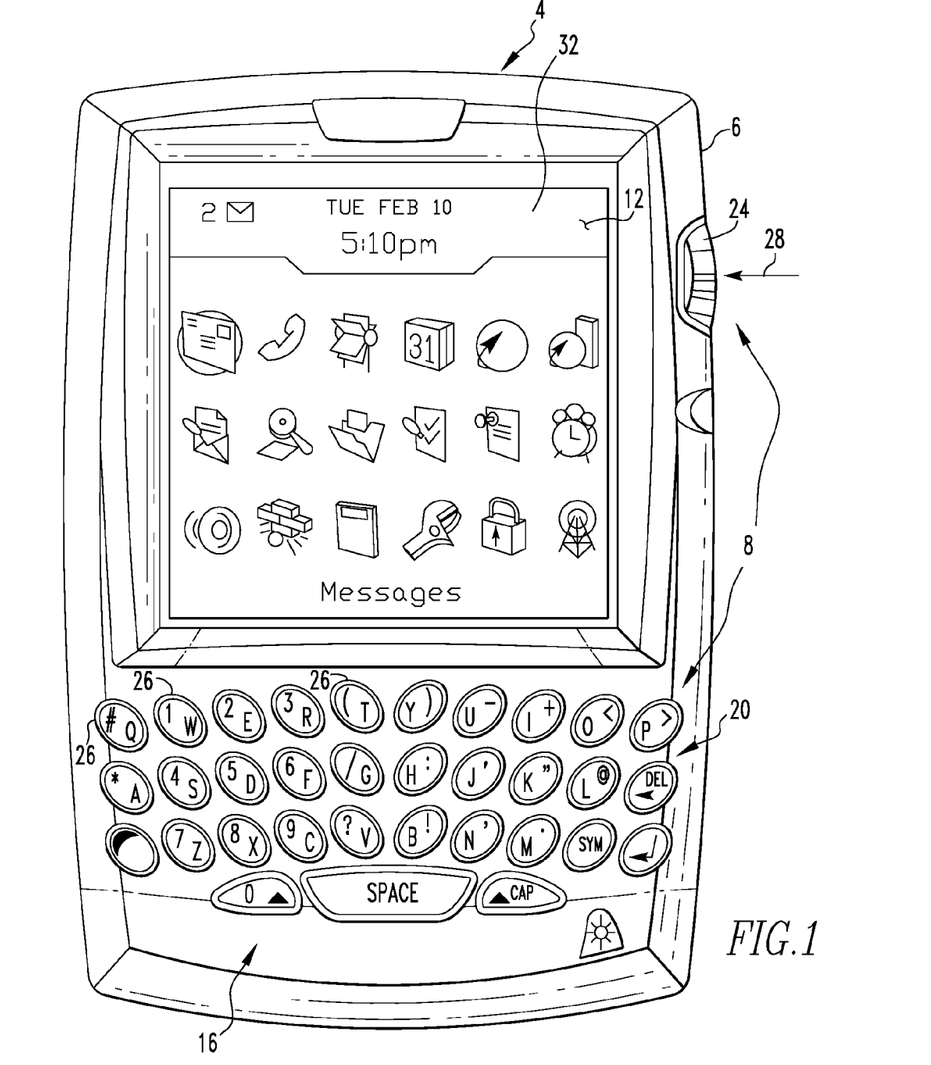
FIG. 1 is a front elevational view of an exemplary handheld electronic device in accordance with the disclosed and claimed concept upon which is performed an improved method in accordance with the disclosed and claimed concept.
Figure 2:
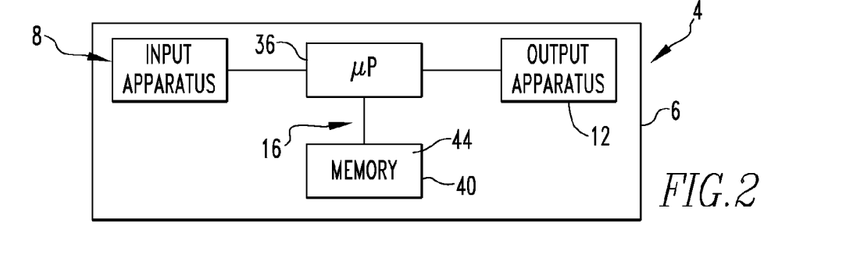
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6 upon which are disposed an input apparatus 8, an output apparatus 12, and a processor apparatus 16. The input apparatus 8 provides input to the processor apparatus 16. The processor apparatus 16 provides output signals to the output apparatus 12.

The input apparatus 8 comprises a keypad 20 and a track wheel 24. The keypad 20 in the exemplary embodiment depicted herein comprises a plurality of keys 26 that are each actuatable to provide input to the processor apparatus 16. The track wheel 24 is rotatable to provide navigational and other input to the processor apparatus 16, and additionally is translatable in the direction of the arrow 28 of FIG. 1 to provide other input, such as selection inputs. The keys 26 and the thumbwheel 24 serve as input members which are actuatable to provide input to the processor apparatus 16. The exemplary output apparatus 12 comprises a display 32.

Examples of other input members not expressly depicted herein would include, for instance, a mouse or trackball for providing navigational inputs, such as could be reflected by movement of a cursor on the display 32, and other inputs such as selection inputs. Still other exemplary input members would include a touch-sensitive display, a stylus pen for making menu input selections on a touch-sensitive display displaying menu options and/or soft buttons of a graphical user interface (GUI), hard buttons disposed on a case of the handheld electronic device 4, an so on. Examples of other output devices would include a touch-sensitive display, an audio speaker, and so on.

An exemplary mouse or trackball would likely advantageously be of a type that provides various types of navigational inputs. For instance, a mouse or trackball could provide navigational inputs in both vertical and horizontal directions with respect to the display 32, which can facilitate input by the user.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to a nonzero quantity, including a quantity of one.

Figure 3:
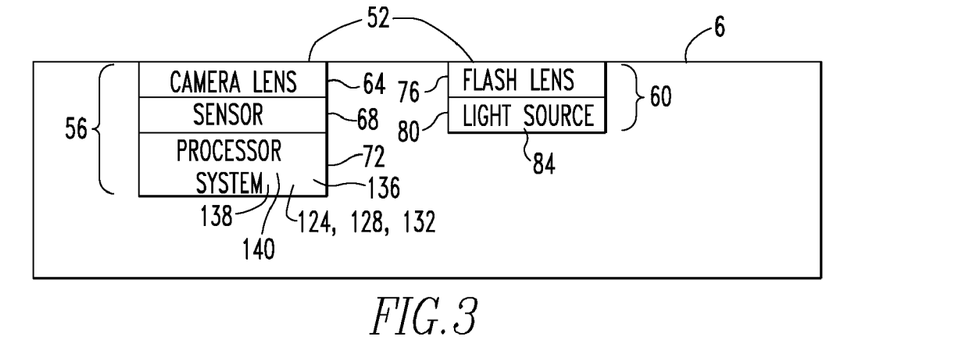
FIG. 3 is a schematic depiction of a camera apparatus in accordance with the disclosed and claimed concept that can be incorporated into the handheld electronic device of FIG. 1.

The input apparatus 8 comprises a camera apparatus 52 disposed on the housing 6. The camera apparatus 52 is considered to comprise a camera 56 and a flash 60, although the camera 56 and the flash 60 can be separate components. The camera 56 is a modular device that comprises a camera lens 64, a sensor 68, and a processor system 72. As employed herein, the expression "modular" shall refer broadly to a self-contained device that is, for instance, purchased and/or installed and/or operable in some fashion as a self-contained unit. As a general matter, the camera lens 64 overlies the sensor 68 which is mounted to a printed circuit board upon which is disposed the processor system 72. Other modular configurations can be employed without departing from the present concept.

Figure 4:
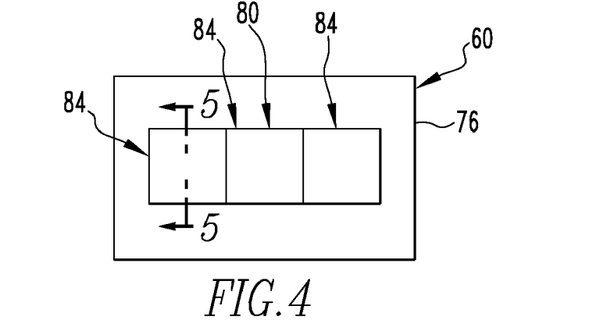
FIG. 4 is a schematic top plan view of a flash of the camera apparatus of FIG. 3.

The flash 60 comprises a flash lens 76 and a light source 80 that similarly can be of a modular nature. The flash lens 76 typically is a Fresnel lens that tends to direct light rays in a particular general direction. The exemplary light source 80 comprises a plurality of LEDs 84. FIG. 4 depicts the exemplary light source 80 as comprising three LEDs 84 aligned adjacent one another, although it is noted that different quantities and arrangements of LEDs 84 can be employed without departing from the present concept, and different LEDs or other appropriate sources of electromagnetic energy can be employed herein without limitation.

Figure 5:
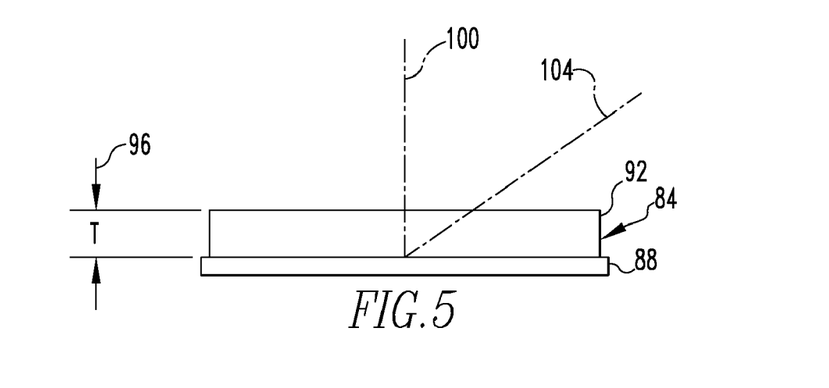
FIG. 5 is a sectional view as taken along line 5-5 of FIG. 4.

As can be understood from FIG. 5, each LED 84 comprises at least a first die 88, which is a silicon wafer which, when electrified, produces electromagnetic energy. The LED 84 additionally includes an absorption/emission layer 92 that overlies the die 88 and that is of a thickness (T) 96 as measured in an on-axis direction 100, i.e., in a direction normal to the plane of the die 88. The electromagnetic energy generated by the die 88 passes through and is at least partially absorbed by the absorption/emission layer 92 which thereby becomes excited and emits its own electromagnetic energy. In the instant example, the electromagnetic energy generated by the die 88 includes, for example, various wavelengths of visible light. The absorption/emission layer 92 absorbs blue wavelengths of light and, when excited, emits yellow wavelengths of light. Electromagnetic energy passing from the die 88 through the absorption/emission layer 92 in the on-axis direction 100 will have a predetermined spectral composition that is a function of the amount of blue light that was absorbed in the absorption/emission layer 92 and was converted into yellow wavelengths of light due to excitation of the absorption/emission layer 92, as well as the amount of blue wavelengths of light that passed through the absorption/emission layer 92 without being absorbed. The LEDs 84 may themselves may comprise additional components such as lenses, coatings, electrical connections, etc., which are not necessarily depicted herein. Moreover, it is noted that the LEDs 84 may be configured without the absorption/emission layer 92, depending upon the needs of the particular application, without departing from the present concept.

However, if the die 88 is considered as a point source of electromagnetic energy, it also will produce electromagnetic energy that travels in off-axis directions, such as is indicated by the exemplary axis 104. Electromagnetic energy passing through the absorption/emission layer 92 in an off-axis direction 104 travels through the absorption/emission layer 92 a distance greater than the thickness (T). As a result, such off-axis electromagnetic radiation will have a relatively greater proportion of its blue light that is absorbed by the absorption/emission layer 92 and converted into yellow light through excitation, and thus will have a relatively lesser quantity of blue light that passes through the absorption/emission layer 92 without being absorbed. As a consequence, light that is progressively further off-axis from the on-axis direction 100 will have progressively greater proportions of yellow spectra and lesser proportions of blue spectra, as a general matter. While the various light spectra generated by the LEDs 84 are nevertheless directed by the flash lens 76 in a given direction to provide a region of illumination, the spectral makeup of the region of illumination will have varying spectral compositions at various locations.

Figure 6:
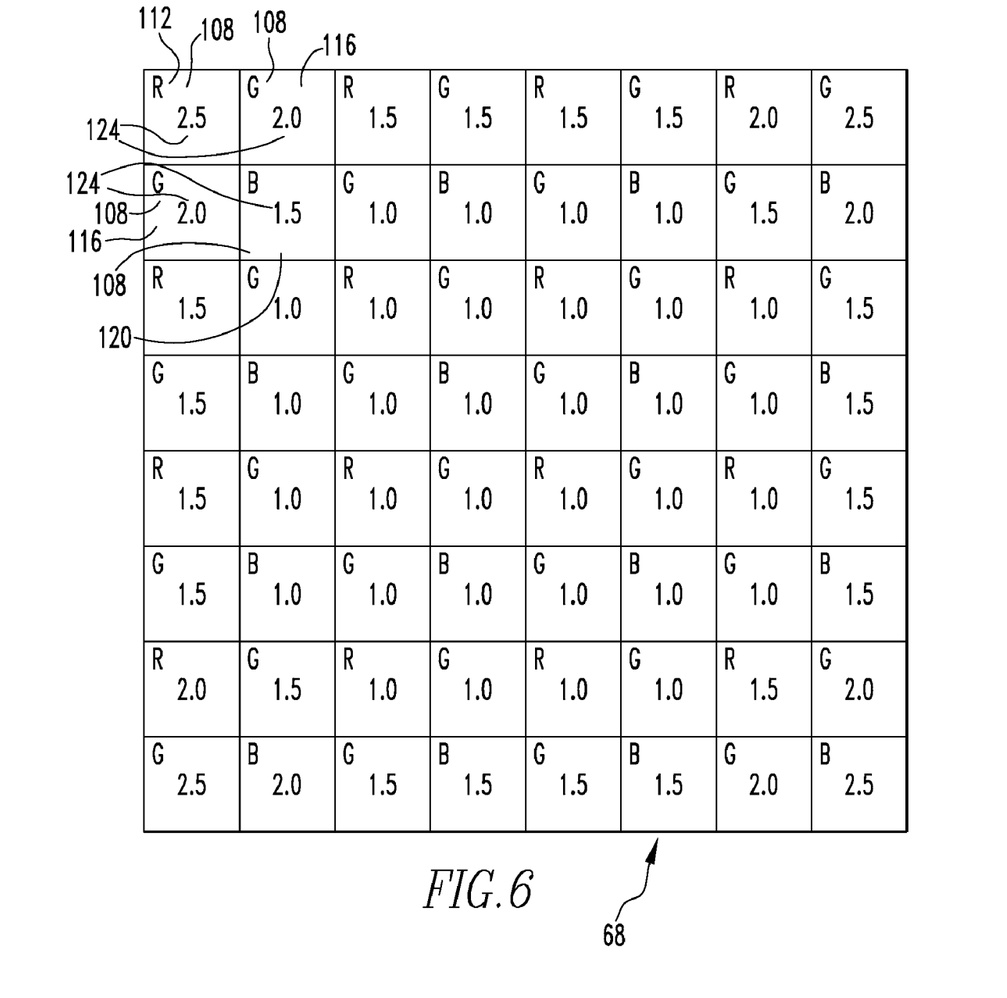
FIG. 6 is a schematic view of an exemplary sensor of the camera apparatus of FIG. 3 and an exemplary set of scalar compensation parameters configured to compensate an image signal for signal variations attributable to a camera lens.
Figure 7:
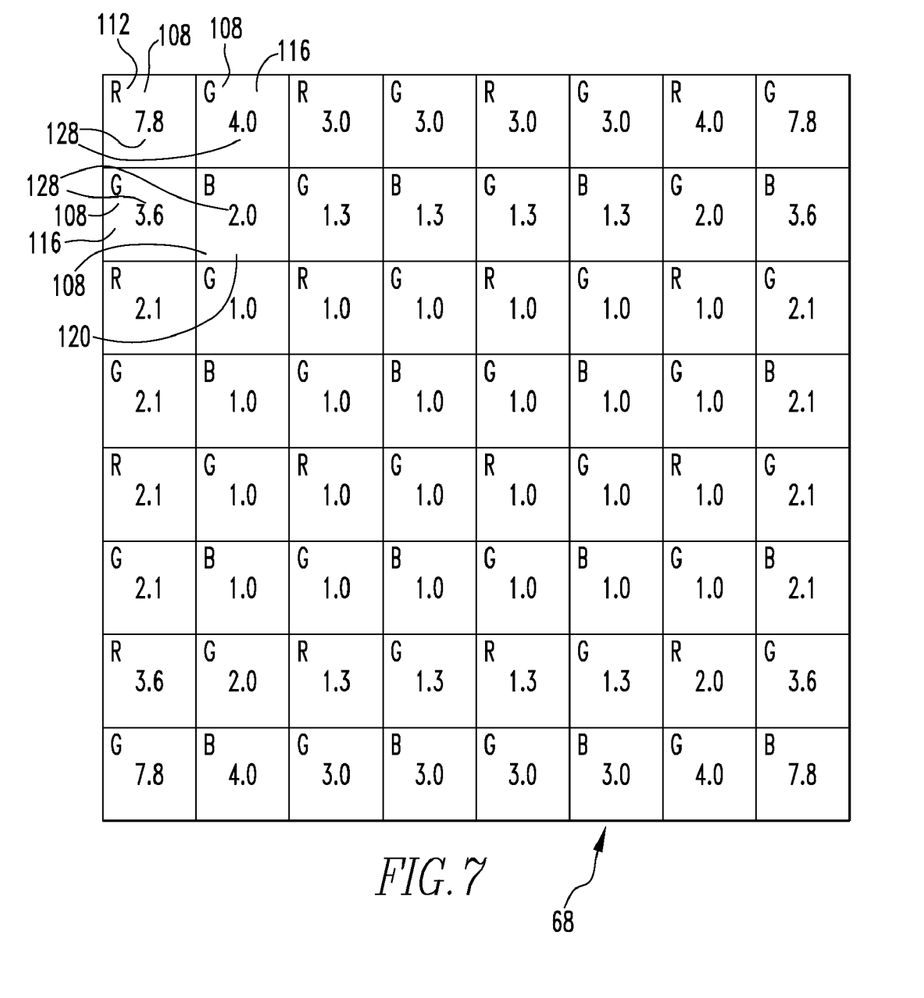
FIG. 7 is a schematic view of an exemplary sensor of the camera apparatus of FIG. 3 and an exemplary set of scalar compensation parameters configured to compensate an image signal for signal variations attributable to a camera lens and a flash lens in combination.
Figure 8:
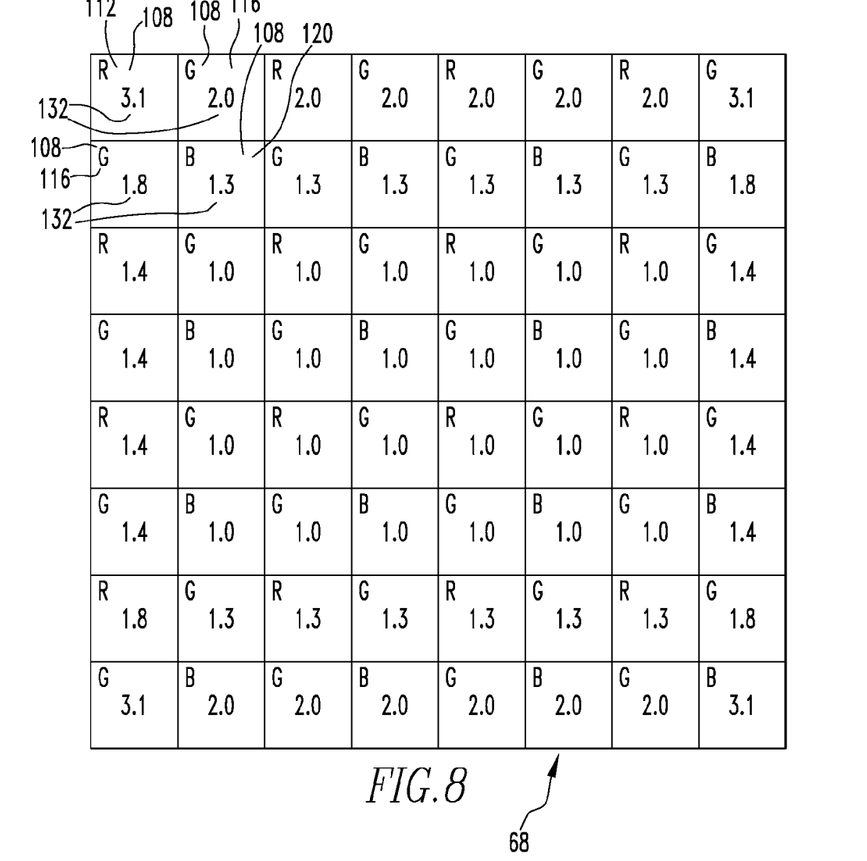
FIG. 8 is a schematic view of an exemplary sensor of the camera apparatus of FIG. 3 and an exemplary set of scalar compensation parameters configured to compensate an image signal for signal variations attributable to a flash lens.

The sensor 68 is depicted in an exemplary fashion in FIGS. 6-8. FIG. 6 depicts the sensor 68 as comprising a grid of sixty-four pixels 108 in an 8×8 layout, although it is understood that the sensor 68 typically will have many more pixels than are depicted in FIG. 6. The pixels 108 comprise a plurality of R pixels 112, G pixels 116, and B pixels 120 in a Bayer layout. As is generally understood, the signals from the G pixels 116 provide luminance data, while signals from the R pixels 112 and B pixels 120 provide color data.

Each exemplary pixel 108 in FIG. 6 is also depicted as having assigned thereto an exemplary scalar compensation parameter 124 that is based upon the characteristics of the camera 24 alone, i.e., without the flash 60, and are primarily based upon the configuration of the camera lens 64. As is depicted schematically in FIG. 3, the processor system 72 of the camera 56 comprises an image processor 136 upon which is executed an embedded storage routine 138. The processor system 72 additionally includes a plurality of storage registers 140 in which are stored the various compensation parameters for the camera lens, such as are represented by the compensation parameters 124 in FIG. 6. Such compensation parameters likely would have been derived experimentally by the manufacturer of the camera 56 and stored in the storage registers 140 for use by the embedded compensation routine 138 in order to process a non-flash image from the sensor 68. While the exemplary compensation parameters 124 are depicted as being scalar values, it is understood that the compensation parameters could be anything that would be employable by the compensation routine 138 to process a non-flash signal from the sensor 68, i.e., they could comprise numerical values, algorithms, and the like without limitation.

As can further be seen from FIG. 6, many of the pixels 108 in the central regions of the sensor 68 are indicated as having assigned thereto a compensation parameter having an exemplary scalar value of 1.0. Other pixels 108 in the peripheral regions have assigned thereto a compensation parameter 124 having an exemplary scalar value of 1.5, and still other pixels 108 at the extreme peripheral regions have assigned thereto an exemplary scalar compensation parameter 124 having a value of 2.0 or 2.5. These are representative, for example, of the relative degree of image boosting that would be required for each of the various pixels 108, it being understood that the signals from the central pixels 108 require less boosting than the peripheral pixels 108.

This is due at least in part to the fact that the camera lens 64 directs light to such peripheral pixels at a more acute angle of incidence than to those pixels 108 in the central regions of the sensor 68, with the result that some of the impinging light at the peripheral pixels is reflected rather than being received and detected by the pixels, thus necessitating a relatively greater degree of signal boost of the signals received from pixels at the peripheral regions of the sensor 68. Such reduced signal at the peripheral regions can additionally result from the fact that the camera lens 64 tends to refract to a relatively greater extent the light that is directed toward the peripheral pixels 108 than the light that is directed toward the central pixels 108, with the result that certain wavelengths of light have an even greater degree of reflection and mis-positioning with respect to the intended pixels 108. In this regard, the compensation parameters for the various R, G, and B pixels 112, 116, and 120 can be selected based at least in part upon such varying diffractive properties of different wavelengths of light.

An exemplary operation of the compensation routine 138 in the processing of an image would be as follows. The sensor 68 would generate a series of values, i.e., signal components, corresponding to the light intensity detected by each pixel, with each pixel providing an intensity value for processing. The compensation routine 138 would determine, for each intensity value from each pixel, the degree of compensation, i.e., boost, that would be applied to each such signal component. The resultant processed signal would then be output or would be transferred to another routine for other signal processing, by way of example. As indicated above, however, the compensation parameters 124 provided by the manufacturer of the camera 56 are pre-stored in the storage registers 140 and are provided for use only in a non-flash application. As such, the camera-only compensation parameters 124 in isolation would be unusable with a flash since a flash provides varying spectral distributions and intensities across a region of illumination, as explained above.

In accordance with the disclosed and claimed concept, however, a different set of compensation parameters, as are depicted in an exemplary fashion in FIG. 7, can be provided for use by the compensation routine 138 and that are selected to provide compensation for the combined effect of the particular camera 56 and the particular flash 60. Such compensation parameters 128 likely are derived experimentally by one intending to combine the camera 56 with the flash, such as the manufacturer of the handheld electronic device 4. The compensation parameters 128 are used to overwrite in the storage registers 140 the compensation parameters 124 that are camera-only compensation parameters. Prior to such overwriting, the compensation parameters 128 can be stored in other storage registers on the processor system 72 or could be stored in the processor apparatus 16 of the handheld electronic device 4, by way of example.

When a flash image signal is to be processed, such overwriting of the compensation parameters 124 by the compensation parameters 128 occurs, and such compensation parameters 128 are employed by the compensation routine 138 in place of the compensation parameters 124 in processing the flash image signal received from the sensor 68. Once the image has been processed with the processing routine 138, the original compensation parameters 124 are rewritten to the storage registers 140, i.e., are used to overwrite the compensation parameters 128, in order to prepare the processor system 72 for the processing of a future non-flash image signal.

In this regard, it is understood that the camera 56 of the camera apparatus 52 often is employed as a viewfinder on the handheld electronic device 4. The viewfinder typically operates in a non-flash fashion in order to conserve battery resources, and the flash is only triggered when it is desired to take a photograph that will ultimately be stored either on the processor system 72 or on the processor apparatus 16 of the handheld electronic device 4. As such, when a flash image is required to be processed, the compensation parameters 128 are used to overwrite the compensation parameters 124 only for the time that is required to process the flash image signal. Once the flash image signal has been processed, however, the original compensation parameters 124, i.e., the non-flash compensation parameters, are rewritten to the storage registers 140 in order to enable the camera 56 to be employed in a viewfinder operation.

By providing the compensation parameters 128 for use in a flash operation, and by enabling such compensation parameters 128 to be employed by the compensation routine 138 embedded in the processor system 72 on the camera 56, the modular nature of the camera 56 does not prevent the camera 56 from being used in conjunction with a flash 60. Rather, by providing the compensation parameters 128 as an adjunct to the compensation parameters 124, the single compensation routine 138 can be used to process both non-flash image signals and flash image signals simply by selectively overwriting the compensation parameters stored in the storage registers 140 in a fashion responsive to the occurrence of a flash operation. This advantageously enables a relatively inexpensive modular camera 56 to be employed in a more versatile fashion than likely was intended by the manufacturer of the camera 56.

In accordance with another embodiment of the disclosed and claimed concept, an additional set of compensation parameters 132 are depicted in an exemplary fashion in FIG. 8 for use in association with the flash 60. However, the additional compensation parameters 132 are provided to compensate solely for the effect of the flash 60 and, more particularly, the flash lens 76, rather than the combined effect of the camera lens 64 and the flash lens 76. As such, in the alternate embodiment the additional compensation parameters 132 and the original compensation parameters 124 are both employed in processing a flash image signal. Specifically, the compensation parameters 124 stored in the storage registers 140 are always employed by the compensation routine 138 in processing an image signal to provide compensation of signal variations attributable to the camera 56. However, if it is determined that the image signal is a flash image signal, the image signal is additionally processed by the compensation routine 138 while employing the additional compensation parameters 132 of FIG. 8. Such additional processing using the compensation parameters 132 provide compensation of signal variations attributable to the flash 60. As such, in the alternative embodiment an image signal is, in effect, processed twice i.e., once to compensate for the camera 56 and employing the original compensation parameters 124 in so doing, and again with the compensation routine 138 to compensate for the effect of the flash 60 and employing the additional compensation parameters 132.

A particular advantage of the alternative embodiment is that of versatility. If a set of parameters are derived for a camera alone, and a separate set of parameters are derived for a flash alone, various cameras can be arranged in various combinations with various flashes. That is, if each camera has its own set of individual compensation parameters, and if each flash has its own individual set of compensation parameters, any camera can be combined with any flash, and the resulting flash image signal will be dual-processed to compensate separately for the camera and for the flash, which promotes a versatility. In this regard, it would be unnecessary to derive an individual set of compensation parameters, such as the compensation parameters 128 of FIG. 7, that are directed toward a particular combination of a specific camera with a specific flash. Additionally, it would be unnecessary to constantly overwrite the parameters that are stored in the storage registers 140, although such overwriting could be employed between the compensation parameters 124 and the compensation parameters 132 if desired.

The alternative embodiment similarly allows the camera 56 to be employed with a flash 60 despite the modular nature of the camera 56 and despite the fact that the camera 56 is supplied with the compensation parameters 124 that are stored in the storage registers 140 and that are intended for use in non-flash circumstances. That is, the modular camera 56 in the alternative embodiment can still be incorporated into the handheld electronic device 4 and used in conjunction with the flash 60 while still employing the compensation routine 138 supplied with the camera 56.

As mentioned above, the exemplary compensation parameters 124, 128, and 132 depicted in an exemplary fashion in FIGS. 6-8, are depicted for purposes of illustration as being scalar values. It is understood, however, that the compensation parameters could be of any form that could be usable by the compensation routine 138. That is, the compensation parameters could, for example, describe algorithms, could be constant values for use in mathematical equations, etc.

Figure 9:
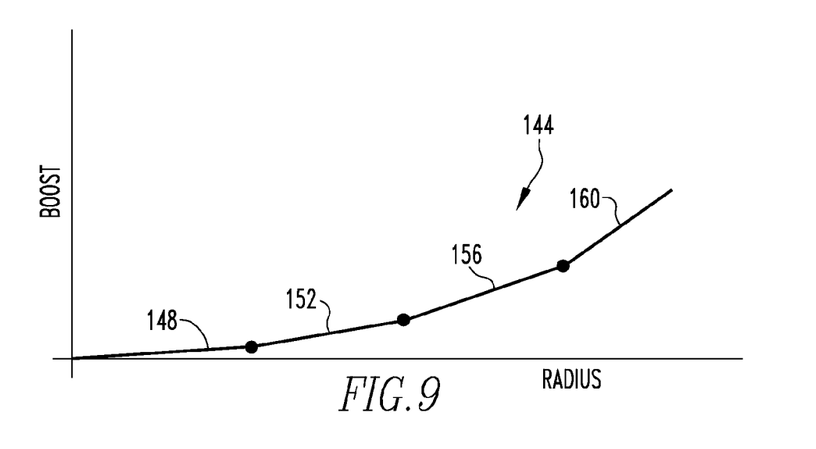
FIG. 9 is a chart depicting an exemplary compensation curve comprised of a plurality of line segments.

One example of an alternate implementation of compensation parameters and the compensation routine 138 is in an exemplary compensation approximation curve 144 depicted generally in FIG. 9. The compensation approximation curve 144 comprises a first line segment 148, a second line segment 152, a third line segment 156, and a fourth line segment 160 which extend in an exemplary end-to-end fashion in a configuration that depicts an increasing boost in signal value in conjunction with an increasing radius of the pixel from a central location on the sensor 68. For instance, the signals from certain of the pixels 108 would be processed in accordance with the first line segment 148, and certain of the pixels 108 would be processed in accordance with the second, third, or fourth line segments 152, 156, or 160, etc. While only a single exemplary compensation approximation curve 144 is depicted herein, it is understood that separate such compensation approximation curves could be provided for each of the R pixels 112, the G pixels 116, and the B pixels 120 for example.

In this regard, it is noted that the R, G, and B pixels 112, 116, and 120 can be treated separately from one another with separate subsets of parameters depending upon the needs of the particular application. For instance, a certain set of compensation parameters, i.e., the set of compensation parameters 124, 128, and/or 132, could itself comprise an R compensation parameter subset, a G compensation parameter subset, and a B compensation parameter subset, for example. Such compensation parameters could be selected, i.e., derived or determined, in accordance with various parameters and/or to overcome particular shortcomings of the camera 56 and/or the flash 60, and particularly could be selected to compensate for spectral variations that result from off-axis direction 104 transmissions of electromagnetic energy from the dies 88 through the absorption/emission layer 92 of the LED 84. Other implementations will be apparent.

Figure 10:
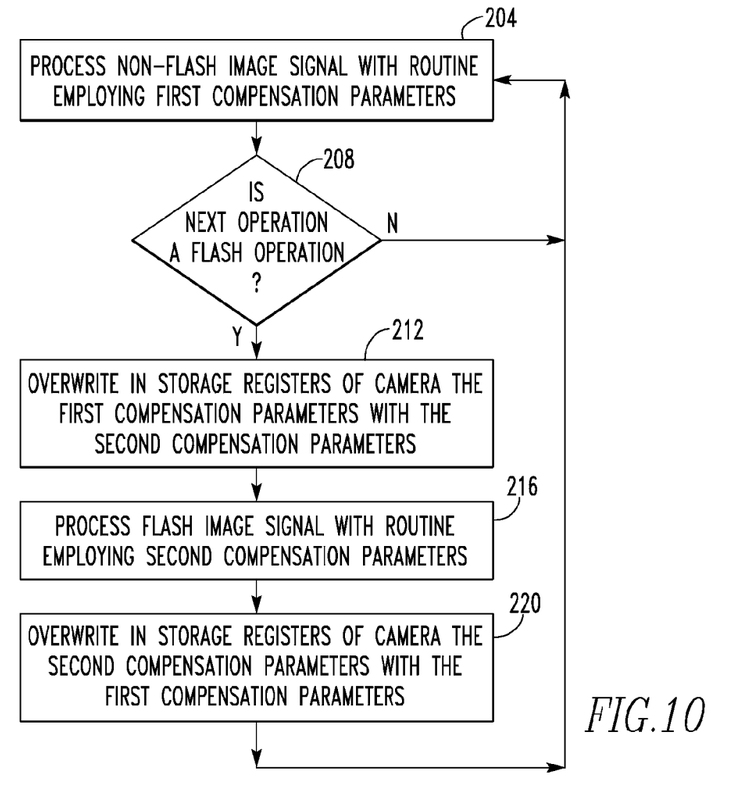
FIG. 10 is an exemplary flowchart of a portion of an improved method in accordance with one embodiment of the disclosed and claimed concept.

In accordance with the foregoing, an exemplary flowchart in accordance with the first embodiment is depicted generally in FIG. 10. The routine processes, as at 204, non-flash image signals with the compensation routine 138 and employing the first compensation parameters, i.e., the compensation parameters 124. It is then determined, as at 208, whether the next operation is a flash operation. If no flash operation is impending, processing continues, as at 204, such as would occur if the camera 56 were being employed as a viewfinder or in taking a non-flash photograph.

On the other hand, if it is determined at 208 that the next operation is a flash operation, the compensation parameters 124 stored in the storage registers 140 are overwritten with a second set of compensation parameters, such as the compensation parameters 128 that are derived for compensating the combined effects of the camera 56 and the flash 60. The incoming image signal from the sensor 68 is then processed, as at 216, employing the second compensation parameters 128. Responsive to the processing of the flash image signal at 216, and more particularly responsive to the completion of the processing at 216, the second compensation parameters 128 stored in the storage registers 140 are overwritten with the first compensation parameters 124, as at 220. Processing thereafter returns to 204.

Figure 11:
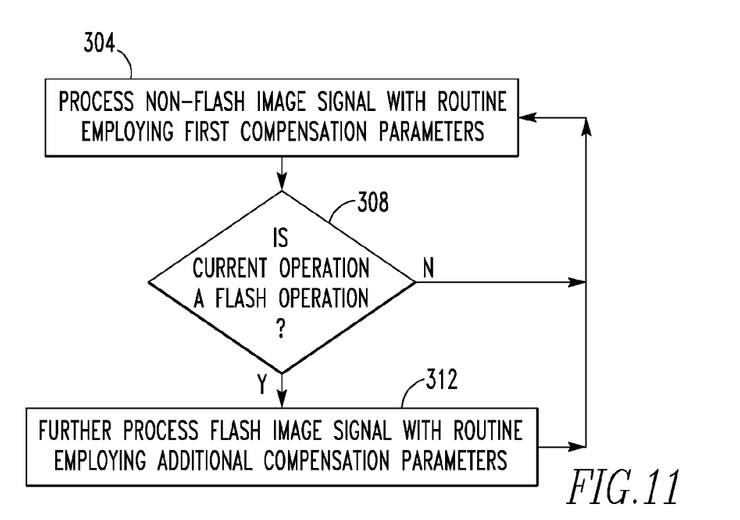
FIG. 11 is an exemplary flowchart of a portion of an improved method in accordance with another embodiment of the disclosed and claimed concept.

Another exemplary flowchart in accordance with the alternative embodiment is depicted generally in FIG. 11. Processing of a non-flash image signal with the compensation routine 138 employing the compensation parameters 124 occurs, as at 304. It is then determined, as at 308, whether the current operation is a flash operation. If it is determined, as at 308, that the current operation is not a flash operation, processing continues to 304, such as would be the case if the camera 56 were functioning as a viewfinder or in taking a non-flash photograph.

If, on the other hand, it is determined at 308 that the current operation is a flash operation, processing continues to 312 where the flash image signal is further processed with the compensation routine 138 employing a set of additional compensation parameters, such as the compensation parameters 132. Processing thereafter returns to 304.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

The invention claimed is:

1. A handheld electronic device comprising:
   an input apparatus comprising a camera apparatus and being structured to provide input to a processor apparatus;
   an output apparatus structured to receive output signals from the processor apparatus and to provide output;
   the camera apparatus comprising a camera and a flash;
   the camera comprising a sensor, a camera lens, and a processor system having a lens shading routine executable thereon;
   the flash comprising a light source and a flash lens;
   the lens shading routine being structured to employ compensation parameters stored in a plurality of storage registers in performing a processing operation on an image signal from the sensor, the lens shading routine being further structured to be executable on the processor system to cause the camera apparatus to perform operations comprising:

storing compensation parameters for processing a non-flash image in the storage registers of the camera;

overwriting at least a portion of the storage registers to provide compensation parameters for processing a flash image;

processing a flash image signal in accordance with the compensation parameters for processing a flash image; and overwriting the storage registers to restore the compensation parameters for processing a non-flash image when processing of the flash image signal is completed.

2. The handheld electronic device of claim 1 wherein the operations further comprise:

processing a non-flash image signal in accordance with the compensation parameters for processing a non-flash image.

3. The handheld electronic device of claim 2 wherein the operations further comprise employing as the compensation parameters for processing a flash image both the compensation parameters for processing a non-flash image and a number of additional compensation parameters configured to compensate the image signal for signal variations attributable to at least a portion of the flash.

4. The handheld electronic device of claim 1, wherein the input apparatus further comprises a keypad.

5. The handheld electronic device of claim 1, wherein the input apparatus further comprises a mouse, trackwheel or trackball.

6. The handheld electronic device of claim 1, wherein the output apparatus further comprises a display to display the processed flash image.

7. The handheld electronic device of claim 1, wherein the flash lens comprises a Fresnel lens.

8. The handheld electronic device of claim 1, wherein the light source comprises a plurality of light emitting diodes (LEDs).

9. The handheld electronic device of claim 1 wherein the sensor comprises a plurality of R pixels, a plurality of G pixels, and a plurality of B pixels distributed about the sensor, wherein the light source comprises a source of electromagnetic energy and an absorption/emission layer, the absorption/emission layer overlying the source of electromagnetic energy and having a thickness (T) in an on-axis direction away from the source of electromagnetic energy, and wherein the second compensation parameters comprise an R compensation parameter subset, a G compensation parameter subset, and a B compensation parameter subset, and the operations further comprise:

receiving as a portion of the flash image signal at least one R pixel signal, at least one G pixel signal, and at least one B pixel signal;

individually processing the R, G and B pixel signals with the R, G, and B compensation parameter subsets, respectively; and employing as the compensation parameters in the R, G, and B compensation parameter subsets compensation parameters that have been selected to compensate for spectral variations resulting from off-axis transmission of electromagnetic energy a greater distance through the absorption/emission layer than the thickness (T).

10. A method of operating a camera apparatus to process an image signal, the camera apparatus comprising a camera and a flash, the camera comprising a sensor, a camera lens, and a processor system having a lens shading routine executable thereon, the flash comprising a light source and a flash lens, the method comprising:

storing compensation parameters for processing a non-flash image in storage registers of the camera;

overwriting at least a portion of the storage registers to provide compensation parameters for processing a flash image;

processing a flash image signal in accordance with the compensation parameters for processing a flash image; and overwriting the storage registers to restore the compensation parameters for processing a non-flash image when processing of the flash image signal is completed.

11. The method of claim 10, further comprising processing a non-flash image signal in accordance with the compensation parameters for processing a non-flash image.

12. The method of claim 10, further comprising employing as the compensation parameters for processing a flash image both the compensation parameters for processing a non-flash image and a number of additional compensation parameters configured to compensate the image signal for signal variations attributable to at least a portion of the flash.

13. The method of claim 10, wherein the sensor comprises a plurality of R pixels, a plurality of G pixels, and a plurality of B pixels distributed about the sensor, wherein the light source comprises a source of electromagnetic energy and an absorption/emission layer, the absorption/emission layer overlying the source of electromagnetic energy and having a thickness (T) in an on-axis direction away from the source of electromagnetic energy, and wherein the second compensation parameters comprise an R compensation parameter subset, a G compensation parameter subset, and a B compensation parameter subset, and further comprising:

receiving as a portion of the flash image signal at least one R pixel signal, at least one G pixel signal, and at least one B pixel signal;

individually processing the R, G and B pixel signals with the R, G, and B compensation parameter subsets, respectively; and employing as the compensation parameters in the R, G, and B compensation parameter subsets compensation parameters that have been selected to compensate for spectral variations resulting from off-axis transmission of electromagnetic energy a greater distance through the absorption/emission layer than the thickness (T).

14. A camera apparatus comprising:

a camera comprising a sensor, a camera lens, and a processor system having a lens shading routine executable thereon;

a flash comprising a light source and a flash lens;

the lens shading routine being structured to employ compensation parameters stored in storage registers in performing a processing operation on an image signal from the sensor, the lens shading routine being further structured to be executable on the processor system to cause the camera apparatus to perform operations comprising:

storing compensation parameters for processing a non-flash image in the storage registers of the camera;

overwriting at least a portion of the storage registers to provide compensation parameters for processing a flash image;

processing a flash image signal in accordance with the compensation parameters for processing a flash image; and overwriting the storage registers to restore the compensation parameters for processing a non-flash image when processing of the flash image signal is completed.

15. The camera apparatus of claim 14 wherein the operations further comprise:
   processing a non-flash image signal in accordance with the compensation parameters for processing a non-flash image.

16. The camera apparatus of claim 15 wherein the operations further comprise employing as the compensation parameters for processing a flash image both the compensation parameters for processing a non-flash image and a number of additional compensation parameters configured to compensate the image signal for signal variations attributable to at least a portion of the flash.

17. The camera apparatus of claim 14 wherein the sensor comprises a plurality of R pixels, a plurality of G pixels, and a plurality of B pixels distributed about the sensor, wherein the light source comprises a source of electromagnetic energy and an absorption/emission layer, the absorption/emission layer overlying the source of electromagnetic energy and having a thickness (T) in an on-axis direction away from the source of electromagnetic energy, and wherein the second compensation parameters comprise an R compensation parameter subset, a G compensation parameter subset, and a B compensation parameter subset, and the operations further comprise:
   receiving as a portion of the flash image signal at least one R pixel signal, at least one G pixel signal, and at least one B pixel signal;
   individually processing the R, G and B pixel signals with the R, G, and B compensation parameter subsets, respectively; and
   employing as the compensation parameters in the R, G, and B compensation parameter subsets compensation parameters that have been selected to compensate for spectral variations resulting from off-axis transmission of electromagnetic energy a greater distance through the absorption/emission layer than the thickness (T).

18. The camera apparatus of claim 14, wherein the flash lens comprises a Fresnel lens.

19. The camera apparatus of claim 14, wherein the light source comprises a plurality of light emitting diodes (LEDs).

20. The camera apparatus of claim 14, further comprising a display to display the processed flash image.

\* \* \* \* \*